United States Patent [19]

Mukohjima et al.

[11] Patent Number: 4,649,311

[45] Date of Patent: Mar. 10, 1987

[54] VIBRATION WAVE MOTOR

[75] Inventors: Hitoshi Mukohjima; Akira Hiramatsu, both of Yokohama, Japan

[73] Assignee: Canon Kabushiki Kaisha, Tokyo, Japan

[21] Appl. No.: 715,412

[22] Filed: Mar. 25, 1985

[30] Foreign Application Priority Data

Apr. 2, 1984 [JP] Japan .................................. 59-65401
Oct. 30, 1984 [JP] Japan ................................ 59-228379

[51] Int. Cl.⁴ .......................................... H01L 41/08
[52] U.S. Cl. .................... 310/323; 310/328; 310/351; 310/353
[58] Field of Search ............... 310/323, 328, 351, 352, 310/353

[56] References Cited

U.S. PATENT DOCUMENTS 4,019,073  4/1977  Vishnevsky et al. ........... 310/359 X
4,453,103  6/1985  Vishnevsky et al. ............... 310/323
4,562,373  12/1985  Tokusima et al. .................. 310/328

Primary Examiner—Patrick R. Salce
Assistant Examiner—Emanuel Todd Voeltz
Attorney, Agent, or Firm—Fitzpatrick, Cella, Harper & Scinto

[57] ABSTRACT

A vibration wave motor has a support plate having a pin for supporting the vibration wave motor and an elastic ring through which a travelling vibration wave of the vibration wave motor propagates. The support plate and the elastic ring are bonded in union so that a support structure is simplified.

26 Claims, 12 Drawing Figures

VIBRATION WAVE MOTOR

BACKGROUND OF THE INVENTION

1. Field of the Invention

The present invention relates to a structure of a vibration wave motor driven by a travelling vibration wave, and more particularly to a support structure of a vibration member of the vibration wave motor.

2. Description of the Prior Art

A vibration wave motor transduces a vibration motion created by application of a periodic voltage to electrostrictive elements to a rotational motion or a linear motion. Because it does not require windings as opposed to a conventional electromagnetic motor, it is simpler and smaller in structure and produces a high torque at a low rotating speed.

FIGS. 1 and 2 show the principle of how such devices are driven numerals 2a and 2b denote elecrostrictive elements which are bonded or welded to the vibration number 1 (usually made of metal) and arranged on one side of the vibration member 1 with a spatial phase difference of $\lambda/4$ therebetween.

The vibration member 1 is used as one electrode for the electrostrictive elements 2a and 2b and an A.C. voltage $V=Vo \sin \omega t$ is applied to the electrostrictive element 2a from an A.C. power supply 3a while an A.C. voltage $V=Vo \sin (\omega t \pm \pi/2)$ having a phase difference of $\lambda/4$ is applied to the electrostrictive element 2b, where signs + and − are selected by a phase shifter 3b in accordance with a direction of movement of the movable member 5. Let us assume that the sign − is selected and the voltage $V=Vo \sin (\omega t - \pi/2)$ is applied to the electrostrictive element 2b.

When only the electrostrictive element 2a is vibrated by the voltae $V=Vo \sin \omega t$, a vibration by a standing wave is generated as shown in FIG. 1(a), and when only the electrostrictive elements 2b is vibrated by the voltage $V+Vo \sin (\omega t - \pi/2)$, a vibration by a standing wave is generated as shown in FIG. 1(b). When the two A.C. voltages having the phase difference therebetween are simultaneously applied to the electrostrictive elements 2a and 2b, the surface wave travels.

FIGS. 1(A), 1(B), 1(C) and 1(D) show the surface waves at times $t=2n\pi/\omega$, $+2n\pi/\omega$, $t=\pi/\omega+2n\pi/\omega$ and $t=3\pi/2\omega+2n\pi/\omega$, respectively, and the wavefront travels in x-direction.

Such a travelling surface wave includes a longitudinal wave and a lateral wave. Looking at a mass point A of the vibration member 1 as shown in FIG. 2, a longitudinal amplitude u and a lateral amplitude w make a rotating elliptic motion.

A movable member 5 is press-contacted to the surface of the vibration member 1 and it makes contact with only an apex of the vibration member. (Actually, it makes contact with an area having a definite width.) Accordingly, the vibration member 5 is driven by the longitudinal amplitude component u of the elliptic motion of the mass points A, A', . . . at the apex and it moves in an arrow direction N.

When the phase of the voltage is shifted 90° by the 90° phase shifter, the surface wave travels in −x direction and the movable member 5 moves in the opposite direction to the direction N.

The velocity of the mass point A at the apex is $V=2\pi f u$ (where f is a vibration frequency) and the velocity of the movable member 5 depends thereon and also depends on the lateral amplitude w because of the frictional drive by the press-contact.

The velocity of the movable member 5 is proportional to the magnitude of the elliptic motion of the mass point A and the magnitude of the elliptic motion is proportional to the voltage applied to the electrostrictive elements. The magnitude of the elliptic motion is also proportional to the areas of the electrostrictive elements 2.

It is difficult to support the vibration member 1 without impeding its vibration. In the past, it was supported by felt material. However, when soft material such as felt is used, it is difficult to precisely position the vibration member 1 and the material is deteriorated by aging.

In order to resolve the above problem with the motor packaging, a support device which uses an auxiliary vibration member has been proposed by the assignee of the present application in co-pending U.S. Ser. No. 663,144 filed on Oct. 22, 1984, now abandoned. However, since a ring-shaped vibration member in the proposed device requires accurate length and width in shape and accurate weight in mass, it is usually difficult and expensive to form the auxiliary vibration member projecting from the ring-shaped vibration member in union with the ring-shaped vibration member.

SUMMARY OF THE INVENTION

It is a primary object of the present invention to provide a vibration wave motor which resolves the shortcomings of the prior art vibration wave motor.

It is another object of the present invention to provide a vibration wave motor in which an auxiliary vibration member for supporting the vibration wave motor and a ring-shaped vibration member are separately prepared and assembled in union.

It is yet another object of the present invention to provide a vibration wave motor to which power is supplied to electrostrictive elements which generate a travelling vibration wave of the vibration wave motor, through an auxiliary vibration member.

DETAILED DESCRIPTION OF THE PREFERRED EMBODIMENTS

Figure 3:
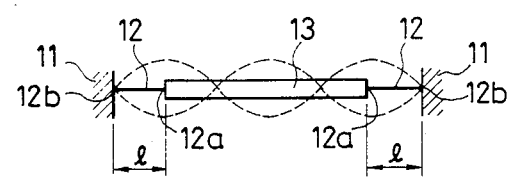
FIG. 3 shows a principle of function of an auxiliary vibration member.

FIG. 3 illustrates a principle of the present invention. A vibration of a ring-shaped vibration member 13 includes various vibration modes and has no mode of vibration because of a travelling wave. By supporting the ring-shaped vibration member 13 by an auxiliary vibration member 12 and setting the vibration condition of the auxiliary vibration member 12 such that a loop is created at a junction 12a of the ring-shaped vibration member 13 and the auxiliary vibration member 12, the vibration of the ring-shaped vibration member 13 is not impeded. In this case, the support end 12b opposite to the junction 12a of the ring-shaped vibration member 13 and the auxiliary vibration member 12 is a fixed end.

Broken lines show examples of vibration. Assuming that a length l is sufficiently longer than a thickness and a sectional shape is uniform, the vibration of the auxiliary vibration member 12 follows the following bending vibration equation.

$$EI\frac{\delta^4 y}{\delta x^4} + \rho A \frac{\delta^2 y}{\delta t^2} = 0 \tag{1}$$

where
- x is a coordinate on an axial line of a beam with an origin being at the support end,
- y is a coordinate in a displacement direction of the vibration, measured from a neutral axis,
- E is the longitudinal modulus of elasticity of the beam,
- I is a sectional secondary moment of the beam,
- A is a sectional area of the beam, and
- $\rho$ is the density of the beam By solving the equation (1) with boundary conditions of:
(1) support end 12b: x=0, fixed end
   zero displacement: y=0
   zero flexure angle: dy/dx=0
(2) junction to the ring: x=l, loop
   zero flexure angle: dy/dx=0
   zero shearing force: d³y/dx³=0,
then we get $$l = \beta \sqrt[4]{\frac{EI}{\rho A \omega^2}} \tag{2}$$

where
- $\omega$ is vibration frequency
- $\beta$ is 2.365, 5.498, 8.639, . . . (vibrations in first, second, third, . . . orders)

When the sectional shape and the material of the beam and a resonance frequency of the vibration member 13 are given, the length l of the auxiliary vibration member 12 is determined from the equation (2).

Figure 4:
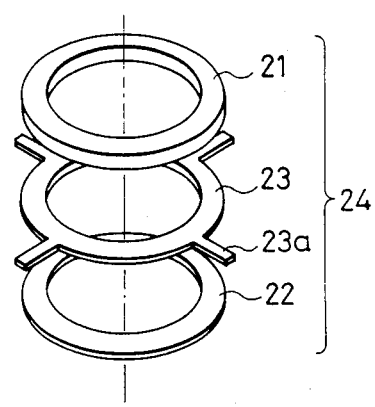
FIG. 4 is a developed perspective view of a first embodiment of a vibration wave motor of the present invention.

FIG. 4 is a perspective view of a first embodiment of the vibration wave motor of the present invention. Numeral 21 denotes a ring-shaped resilient member made of metal, numeral 22 denotes an electrostrictive element for exciting the elastic member 21, and numeral 23 denotes a support member which is fixed to the elastic member 21 and the electrostrictive element 22 to form a ring-shaped vibration member. The support member 23 is separate from the ring-shaped elastic member 21 and has a plurality of auxiliary vibration members 23a formed in union to support the ring-shaped vibration member 24.

Figure 5:
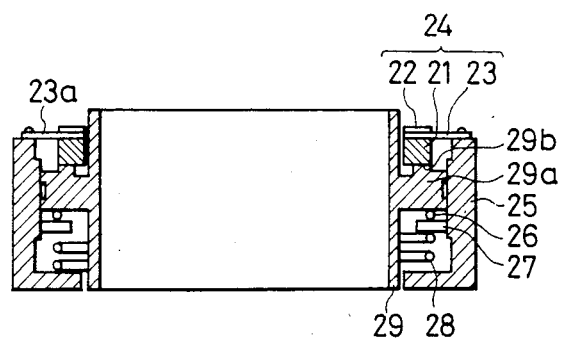
FIG. 5 is a sectional view of a second embodiment of the vibration wave motor of the present invention.

FIG. 5 is a sectional view of a second embodiment of the vibration wave motor of the present invention. The elastic member 21 and the electrostrictive elements 22 are bonded to the support plate 23 to form the ring-shaped vibration member 24. Numeral 25 denotes a motor frame which holds the ring-shaped vibration member 24 shown in FIG. 4 and a rotor 29 to be described later, numeral 26 denotes a thrust bearing, numeral 27 denotes a washer, numeral 28 denotes a spring which press-contacts the rotor 29 to the ring-shaped vibration member 24 and applies a spring force to the rotor 29 through the thrust bearing 26. The rotor 29 is rotatably supported by a shaft 29a of the motor frame 25 and has a contact 29b which contacts to the ring-shaped vibration member. The ring-shaped vibration member is fixed to the motor frame 25 by bolts through the auxiliary vibration members 23a formed in the support plate 23 so that it is readily positioned. The length of the auxiliary vibration member 23a is determined by the equation (2).

Figure 6:
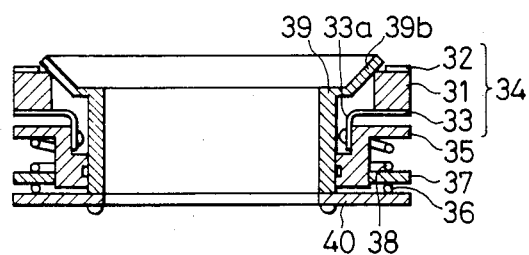
FIG. 6 is a sectional view of a third embodiment vibration wave motor of the present invention.

FIG. 6 shows a sectional view of a third embodiment of the vibration wave motor of the present invention. An electrostrictive element 32 and a support plate 33 are bonded to opposite sides of an elastic member 31 to form a ring-shaped vibration member 34. An auxiliary vibration member 33a formed in the support plate 33 is arranged inwardly of the ring-shaped vibration member 34 and has a right angle folded portion. The ring-shaped vibration member 34 is fixed to a motor frame 35 by bolts at the folded portion of the auxiliary vibration member 33a. Accordingly, the overall motor size is compact even if the length of the auxiliary vibration member given by the equation (2) is long. The inner surface of the rotor 39 is rotatably supported by the motor frame 35 and biased downward by a spring 38 through a thrust bearing 36 and a washer 37. The rotor 39 contacts an inner corner of the ring-shaped vibration member 34 at a contact area 39a which contacts to the ring-shaped vibration member 34 and is pressed by the biasing force of the spring 38 so that the vibration motion of the vibration member 34 is transduced to a rotational movement to rotate the rotor 39. Thus, the motor diameter does not increase and a compact motor is provided. The vibration member may be attached to the support plate by bonding or welding.

In the present embodiment, the number of auxiliary vibration members can be changed by exchanging the support plate. In the past, where the auxiliary vibration members are connected to the ring-shaped vibration member by solder-bonding, durability is not high. In the present embodiment, the durability is high because the auxiliary vibration members are integral with the support plate.

Figure 7:
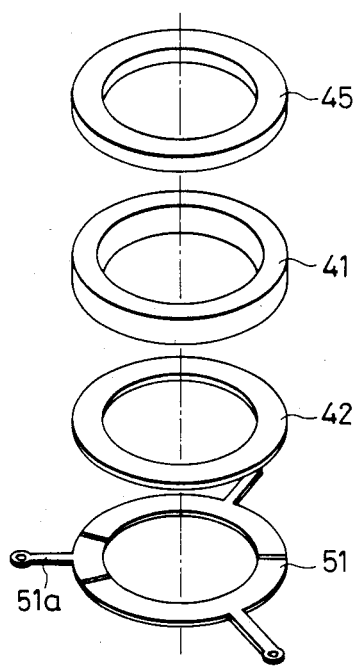
FIG. 7 is a developed perspective view of a fourth embodiment of the vibration wave motor of the present invention.
Figure 8:
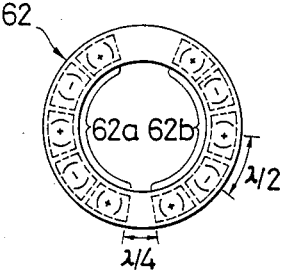
FIG. 8 is a plan view of the electrostrictive element shown FIG. 7.
Figure 9:
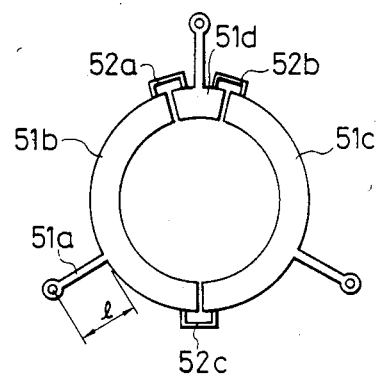
FIG. 9 is a plan view of the auxiliary vibration member shown in FIG. 7, FIGS. 10 and 11 are a plan view of an electrostrictive element and a plan view of an auxiliary vibration member, respectively, in a fifth embodiment of the present invention.

Referring to FIGS. 7 to 9, a fourth embodiment of the present invention is explained wherein at least a portion of an auxiliary vibration member is made of conductive material and power is supplied to an electrostrictive element which generates a travelling vibration wave through the auxiliary vibration member.

Figure 1:
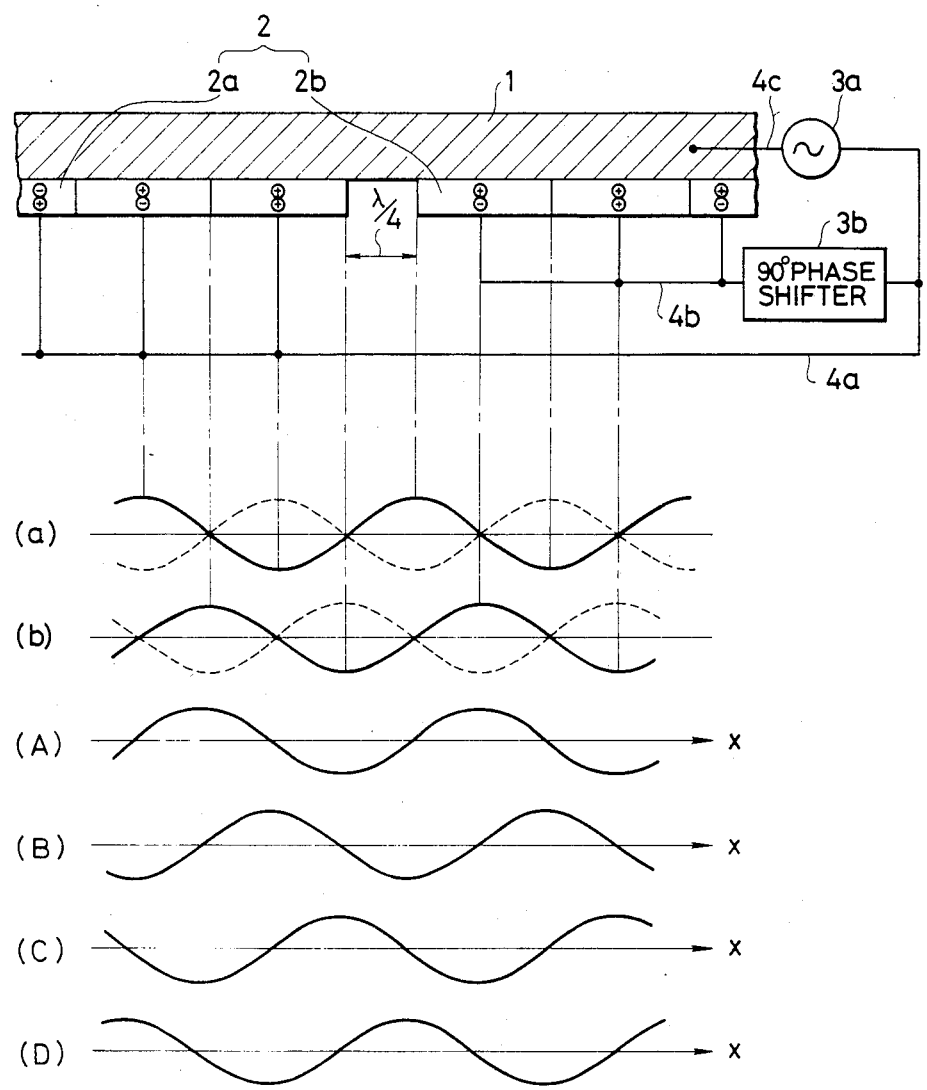
FIG. 1 and 2 illustrate a principle of a vibration wave motor.
Figure 2:
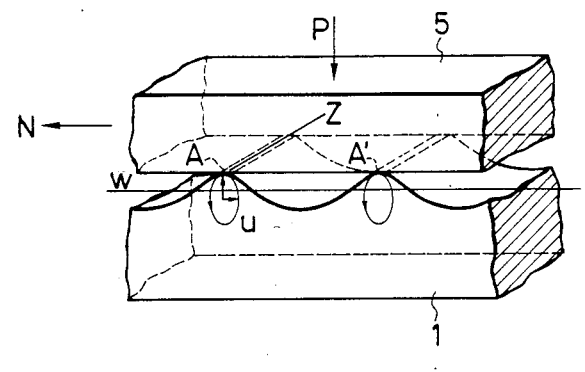

FIG. 7 is a developed perspective view of the fourth embodiment of the vibration wave motor, FIG. 8 is a plan view of the electrostrictive element shown in FIG. 7, and FIG. 9 is a plan view of the auxiliary vibration member shown in FIG. 7. The elements shown in those figures which have the same functions as those shown in FIGS. 1 and 2 are designated by like numerals. Numeral 41 denotes the vibration member, numeral 42 denotes the electrostrictive element and numeral 45 denotes the movable member which, in the present embodiment, is rotated by a travelling wave generated in the vibration member 41. Numeral 51 denotes an auxiliary vibration member which has support areas 51a (three in the illustrated embodiment). The support areas 51a are made of conductive material so that they serve as lead wires for supplying a periodic voltage to the electrostrictive element 42. The vibration member 41, electrostrictive element 42 and auxiliary vibration member 51 are bonded together by conductive bond.

Referring to FIGS. 8 and 9, the auxiliary vibration member 51 and the electrostrictive element 42 are explained in detail.

As shown in FIG. 8, electrostrictive elements 62a and 62b are polarized with the phase difference of λ/4 in accordance with the drive principle described above. The auxiliary vibration member 51 is divided into electrodes 51b, 51c and 51d as shown in FIG. 9. The electrode 51b faces the electrostrictive cells 42a of the electrostrictive element 42, and the electrode 51c faces the electrostrictive cells 42b. The electrodes 51b, 51c and 51d each has a support area 51a one end of which has a bolt hole formed to fix the motor to a case.

In the present embodiment, the bolt holes are spaced by a predetermined distance from the electrodes so that they are fixed ends when the electrostrictive element 42 vibrates. Thus, the bolt holes are modes of the vibration and the areas of the auxiliary vibration member which contact to the electrostrictive element are loops of the vibration. In this manner, the vibration member can be held by the motor case without impedance to the vibration of the vibration member.

Numerals 52a, 52b, 52c and 52d denote couplers for connecting the electrodes 51b, 51c and 51d. They are provided because the auxiliary vibration member 51 is formed by pressing. The auxiliary vibration member 51 is pressed as shown in FIG. 9, conductive bond is applied to the auxiliary vibration element in a pattern of the electrostrictive cells to bond the auxiliary vibration member 51, the electrostrictive element 42 and the vibration member 41 together, and the couplers 52a, 52b and 52c are cut along broken lines shown in FIG. 9. In this manner, the auxiliary vibration member is readily constructed.

In accordance with this method, the electrodes 51b, 51c and 51d can be more readily positioned than in the method in which the electrodes 51b, 51c and 51d having conductive areas are fixed to the auxiliary vibration member made of insulative material. After the couplers 52a, 52b and 52c have been cut, the electrodes 51b, 51c and 51d are electrically insulated from each other. Accordingly, separate insulation processing is not necessary.

Figure 10:
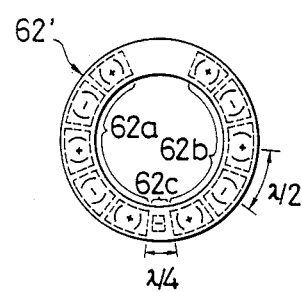
Figure 11:
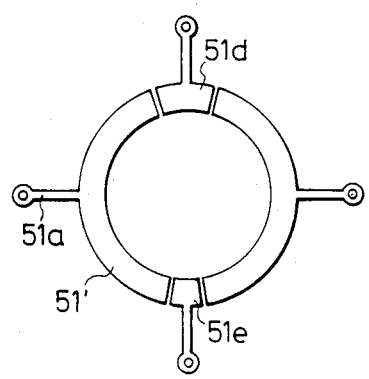

Referring to FIGS. 10 and 11, other embodiments of the electrostrictive element and the auxiliary vibration member are explained.

FIG. 10 is a plan view of an electrostrictive element 62 having a polarized electrostrictive cell 62c therein for detecting a vibration status of the electrostrictive element.

FIG. 11 is a plan view of an auxiliary vibration member 51' used with the electrostrictive element shown in FIG. 10. The auxiliary vibration member 51' has an electrode 51e at a position corresponding to the electrostrictive cell 62c shown in FIG. 10.

In the present embodiment, the vibration member 41, the movable member 45 and other elements are identical to those in the embodiments shown in FIG. 7 and they are not explained here.

Figure 12:
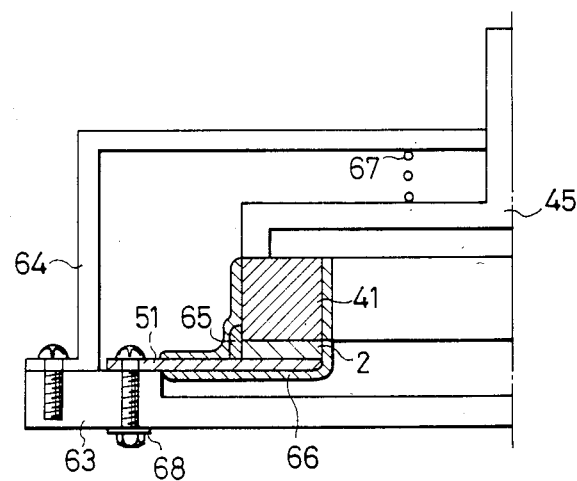
FIG. 12 is a partial sectional view of the vibration wave motor shown in FIG. 7.

FIG. 12 is a partial sectional view of the vibration wave motor shown in FIG. 7. Numeral 63 denotes a platform by which the vibration wave motor is attached to a case. The vibration member 41 is fixed to the platform 63 through the support 51a of the auxiliary vibration member 51. Numeral 64 denotes an outer motor cylinder. Numeral 67 denotes a spring for press-contacting the movable member 45 to the vibration member 41, and numeral 65 denotes conductive paste for establishing conduction between the vibration member 41 and the support member 51d. The conductive paste is applied to the areas of the vibration member 41 corresponding to the support member 51d. Numeral 66 denote an insulative resin layer coated except for a friction area of the movable member 45 and the vibration member 41. It prevents conduction between the support area and the electrostrictive element, caused by water drop.

The auxiliary vibration member 51 which serves as the lead electrode is electrically connected to an external power source through the bolts 68 to which power is supplied. Accordingly, no separate power supply terminal need be provided.

In the present embodiment, the auxiliary vibration member 51 is bolted to an attachment base of the motor case at ends of the projecting support members thereof. Alternatively, the auxiliary vibration member may be a large ring-shaped plate having a sufficient diameter to cover the support areas of the auxiliary vibration member shown in FIG. 7.

Where the platform 63 is molded with the motor case, the support areas of the auxiliary vibration member 51 may be insert-molded to the platform. In this method, there is no need to form the bolt holes in the support areas of the auxiliary vibration member 51 to bolt it and the support areas of the auxiliary vibration member can be fixed to the platform. In order to supply the power through the support areas of the auxiliary vibration member 51, a portion of the support areas may be protruded from the motor case.

In the embodiment shown in FIG. 7, the number of support areas is three, and in the embodiment shown in FIG. 11, it is four. Any number of support areas may be used so long as it is sufficient to supply the power to the electrostrictive element to generate the travelling vibration wave in the vibration member.

In the embodiments shown in FIGS. 7 to 12, the power is supplied to the electrostrictive element of the vibration wave motor through the auxiliary vibration member provided to support the vibration wave motor. Accordingly, as opposed to the motor in which the lead wires are taken out of the elecrostrictive element and the power is supplied through the lead wires, there is no risk of break of the lead wires by fatigue due to the vibration of the vibration member or influence to the drive condition due to partial non-uniformity of mass of the vibration member due to solder used to connect the lead wires.

In the above embodiments, the term electrostrictive element is used to represent an element which is deformed by an application of a voltage, that is, an electro-mechanical transducer. The term electrostrictive element herein also includes a conventional piezoelectric element.

As described hereinabove, in accordance with the present invention, the ring-shaped vibration member of the vibration wave motor is supported by a support plate having an auxiliary vibration member of an appropriate length, without impeding the vibration of the ring-shaped vibration member. The problem of durability due to the deterioration of the material of the soldered area which is caused when the support pin for supporting the ring-shaped vibration member is solder-bonded to the vibration member is also resolved. The ends of the auxiliary vibration member can be fixed by the bolts and the ring-shaped vibration member can be precisely positioned. The support plate can be readily formed by pressing. By separately forming the support plate having the auxiliary vibration member and assembling it in union with the vibration member and the electrostrictive element, the manufacturing cost is reduced and a freedom of layout of the electrostrictive element and the auxiliary vibration member increases. By exchanging the support plate having the auxiliary vibration member, the number and shape of the auxiliary vibration member can be readily changed.

What is claimed is:

1. A vibration wave motor comprising:
    a vibration member including an electrostrictive element arranged to generate a travelling vibration wave when power is supplied thereto;
    a motor case; and
    a support member formed integrally with a pin-shaped auxiliary vibration member for supporting said vibration member by said motor case, said support member being fixed to said vibration member,
    said pin-shaped auxiliary vibration member having a length and a width determined to prevent the travelling vibration wave generated in said vibration wave member from propagating to said motor case;
    wherein areas of said auxiliary vibration member to be connected to said motor case have bolt holes formed therein, and said auxiliary vibration member is fixed to said motor case by bolts inserted in said bolt holes.

2. A vibration wave motor according to claim 1 wherein said support member and said auxiliary vibration member are pressed in union.

3. A vibration wave motor according to claim 1 wherein at least a portion of said auxiliary vibration member is made of conductor and a power is supplied to said electrostrictive element through said auxiliary vibration member.

4. A vibration wave motor according to claim 3 wherein at least a portion of said support member is made of conductor, and said support member and said vibration member including said electrostrictive element are bonded together by conductive bond.

5. A vibration wave motor according to claim 1 wherein said pin-shaped auxiliary vibration member is bent.

6. A vibration wave motor according to claim 1 wherein said motor case is molded and said auxiliary vibration member is insert-molded into said motor case.

7. A vibration wave motor according to claim 3 wherein said motor case is molded, said auxiliary vibration member is insert-molded into said motor case, a portion of said auxiliary vibration member protrudes from said motor case, and a power is supplied to said electrostrictive element through said protruded portion.

8. A vibration wave motor comprising:
    a vibration member including an electrostrictive element arranged to generate a resonant motion upon application of power at a resonance frequency;
    a motor case; and
    a support member integral with a pin-shaped auxiliary vibration member for supporting said vibration member by said motor case, said support member being fixed to said vibration member,
    wherein at least a portion of said auxiliary vibration member is made of an electrical conductor, and power is supplied to said electrostrictive element through said auxiliary vibration member.

9. A vibration wave motor according to claim 8 wherein said pin-shaped auxiliary vibration member has a length and a width determined to prevent a travelling vibration wave generated in said vibration member from propagating to said motor case.

10. A vibration wave motor according to claim 1, wherein said electrostrictive elements are piezoelectric elements.

11. A vibration wave motor according to claim 8, wherein said electrostrictive elements are piezoelectric elements.

12. A vibration wave motor comprising:
    (a) a motor case;
    (b) a vibration member including an electro-mechanical converting element, said vibration member being arranged so as to generate a travelling vibration wave in response to an AC voltage supplied to said vibration member; and
    (c) a support member for supporting said vibration member, said support member having a plurality of auxiliary vibration members, each said auxiliary vibration member being fixed between said motor case and said support member, wherein said support member and said vibration member are not integral.

13. A vibration wave motor according to claim 12, wherein said auxiliary vibration member is pin-shaped.

14. A vibration wave motor according to claim 13, wherein said pin-shaped auxiliary vibration member has length and width dimensions determined to prevent the travelling vibration wave generated in said vibration member from propagating to said motor case.

15. A vibration wave motor according to claim 14, wherein said auxiliary vibration member has bolt holes formed therein, and said auxiliary vibration member is fixed to said motor case by bolts inserted in said bolt holes.

16. A vibration wave motor according to claim 14 wherein said pin-shaped auxiliary vibration member is bent.

17. A vibration wave motor according to claim 14 wherein said motor case is molded and said auxiliary vibration member is insert-molded in said motor case.

18. A vibration wave motor according to claim 12, wherein said support member and said auxiliary vibration member are integral.

19. A vibration wave motor according to claim 18, wherein at least a portion of said support member is an electrical conductor, and said support member including said electro-mechanical converting element and said vibration member are bonded together.

20. A vibration wave motor according to claim 12, wherein at least a portion of said auxiliary vibration member is made of an electrical conductor and an AC voltage is supplied to said electro-mechanical converting element through said auxiliary vibration member.

21. A vibration wave motor according to claim 20 wherein said auxiliary vibration member has bolt holes formed therein, and said auxiliary vibration member is fixed to said motor case by bolts inserted in said bolt holes, and an AC voltage is supplied to said electro-mechanical converting element through said bolts.

22. A vibration wave motor according to claim 20 wherein said motor case is molded, said auxiliary vibration member is insert-molded in said motor case so that a portion of said auxiliary vibration member protrudes from said motor case, and power is supplied to said electro-mechanical converting element through said protruding portion.

23. A vibration wave motor comprising:
(a) a motor case;
(b) a vibration member including an electro-mechanical converting element, said vibration member being arranged so as to generate a travelling vibration wave; and
(c) a plurality of auxiliary vibration members having electro-conductive portions extending from a support member for connecting said vibration member to said motor case, said travelling vibration wave being generated on said vibration member by supplying electric power to said electro-mechanical converting element through said auxiliary vibration member, wherein said support member and said vibration member are not integral.

24. A vibration wave motor according to claim 23 wherein said auxiliary vibration member is pin-shaped.

25. A vibration wave motor according to claim 24 wherein said pin-shaped auxiliary vibration member has length and width dimensions determined to prevent the travelling vibration wave generated in said vibration member from propagating to said motor case.

26. A vibration wave motor according to claim 25 wherein areas of said auxiliary vibration member have bolt holes formed therein, and said auxiliary vibration member is fixed to said motor case by bolts inserted into said bolt holes.

* * * * *